(12) United States Patent
Chen

(10) Patent No.: US 6,305,819 B1
(45) Date of Patent: Oct. 23, 2001

(54) ILLUMINATING WARNING DEVICE

(76) Inventor: Chi-Hen Chen, 8F-3, No. 712, Jin San Road, Tso-Ing distrtict, Kaohsiung (TW)

( * ) Notice: Subject to any disclaimer, the term of this patent is extended or adjusted under 35 U.S.C. 154(b) by 0 days.

(21) Appl. No.: 09/572,080

(22) Filed: May 17, 2000

(51) Int. Cl.$^7$ .............................. F21L 4/02; F21W 111/00
(52) U.S. Cl. .................. 362/186; 362/184; 362/191; 362/249; 362/398; 362/400; 362/800; 340/321
(58) Field of Search .................. 362/184, 186, 362/190, 191, 227, 235, 236, 240, 249, 398–400, 486, 800; 340/321, 815.45

(56) References Cited

U.S. PATENT DOCUMENTS

| | | | |
|---|---|---|---|
| 1,780,004 | * 10/1930 | Connelly | 340/321 |
| 2,355,982 | * 8/1944 | Linhardt, Jr. | 362/186 |
| 3,728,708 | * 4/1973 | Culbertson | 340/321 |
| 5,152,601 | * 10/1992 | Ferg | 362/186 |
| 5,622,423 | * 4/1997 | Lee | 362/186 |
| 5,890,794 | * 4/1999 | Abtahi et al. | 362/184 |
| 6,135,612 | * 10/2000 | Clore | 362/184 |

* cited by examiner

Primary Examiner—Alan Cariaso
(74) Attorney, Agent, or Firm—Dougherty & Troxell

(57) ABSTRACT

An illuminating warning device has a transparent casing, a cap and an inner tube. The casing is provided to receive therein the inner tube that has a plurality of circuits boards securely mounted on the outer periphery thereof and having a plurality of illuminating elements electrically connected with the circuit boards. A switch mounted on the inner tube and protruded out from the periphery of the casing is able to control the illumination of the illuminating elements in the casing. Furthermore, a magnet received in the bottom of the inner tube enables the device to magnetically adhere to a metal surface as a warning signal to others.

6 Claims, 4 Drawing Sheets

ILLUMINATING WARNING DEVICE

BACKGROUND OF THE INVENTION

1. Field of the Invention

The present invention relates to an illuminating warning device, and more particularly to an illuminating warning device having a plurality of illuminating elements received in a casing made of a transparent material. The device further has a magnet received in a bottom thereof to be magnetically adhered to a metal surface and a handle for holding or a strap to be extended therethrough to be mounted around the body of a user.

2. Description of Related Art

In the night, because the visibility is poor, it is quite dangerous for a pedestrian to walk on the street or for an automobile driver who is having a car malfunction on the road. To avoid danger, normally, a pedestrian carries a flashlight in an area where the street light is not good enough for the incoming vehicle to see clearly and the automobile driver will put a warning sign behind the malfunctioned car to warn the incoming car. However, carrying a flashlight o placing a warning sign is either too troublesome or is still not effective to indicate that there is a car parked on the road due to malfunction.

Therefore, it is an objective of the invention to provide an improved illuminating warning device to mitigate and/or obviate the aforementioned problems.

SUMMARY OF THE INVENTION

The primary objective of the invention is to provide an improved illuminating warning device having a plurality of illuminating elements received in a hollow cylindrical casing made of a transparent material, a handle mounted on the outer surface of the casing and a magnet received in the bottom of the casing. With such an arrangement, the user is able to attach the illuminating warning device on a metal surface, hold the device or mount around the device on the body while walking or even attach the device on an umbrella in rainy days.

Other objects, advantages and novel features of the invention will become more apparent from the following detailed description when taken in conjunction with the accompanying drawings.

DETAILED DESCRIPTION OF PREFERRED EMBODIMENT

Figure 1:
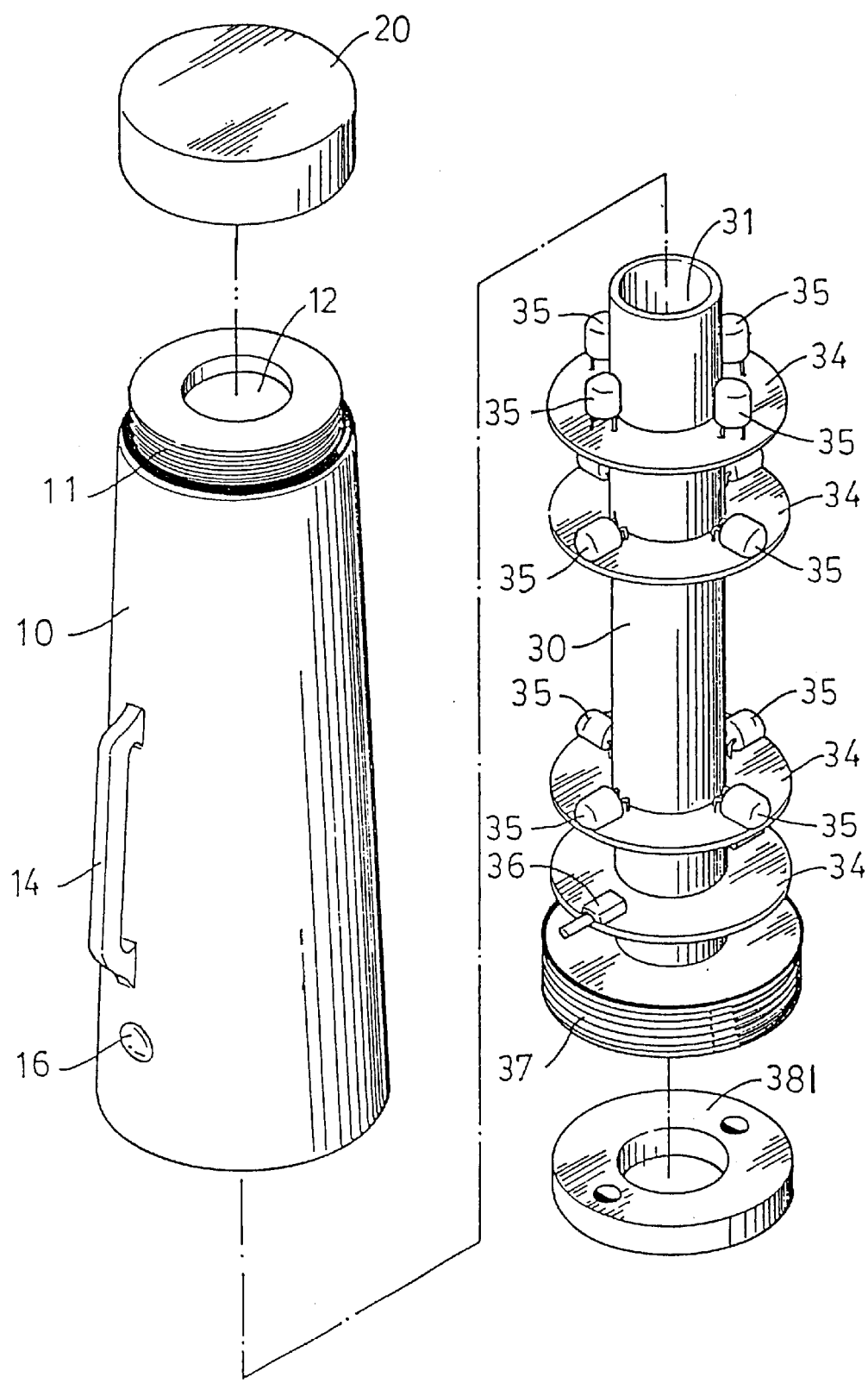
FIG. 1 is an exploded perspective view of the illuminating warning device constructed in accordance with the present invention.
Figure 2:
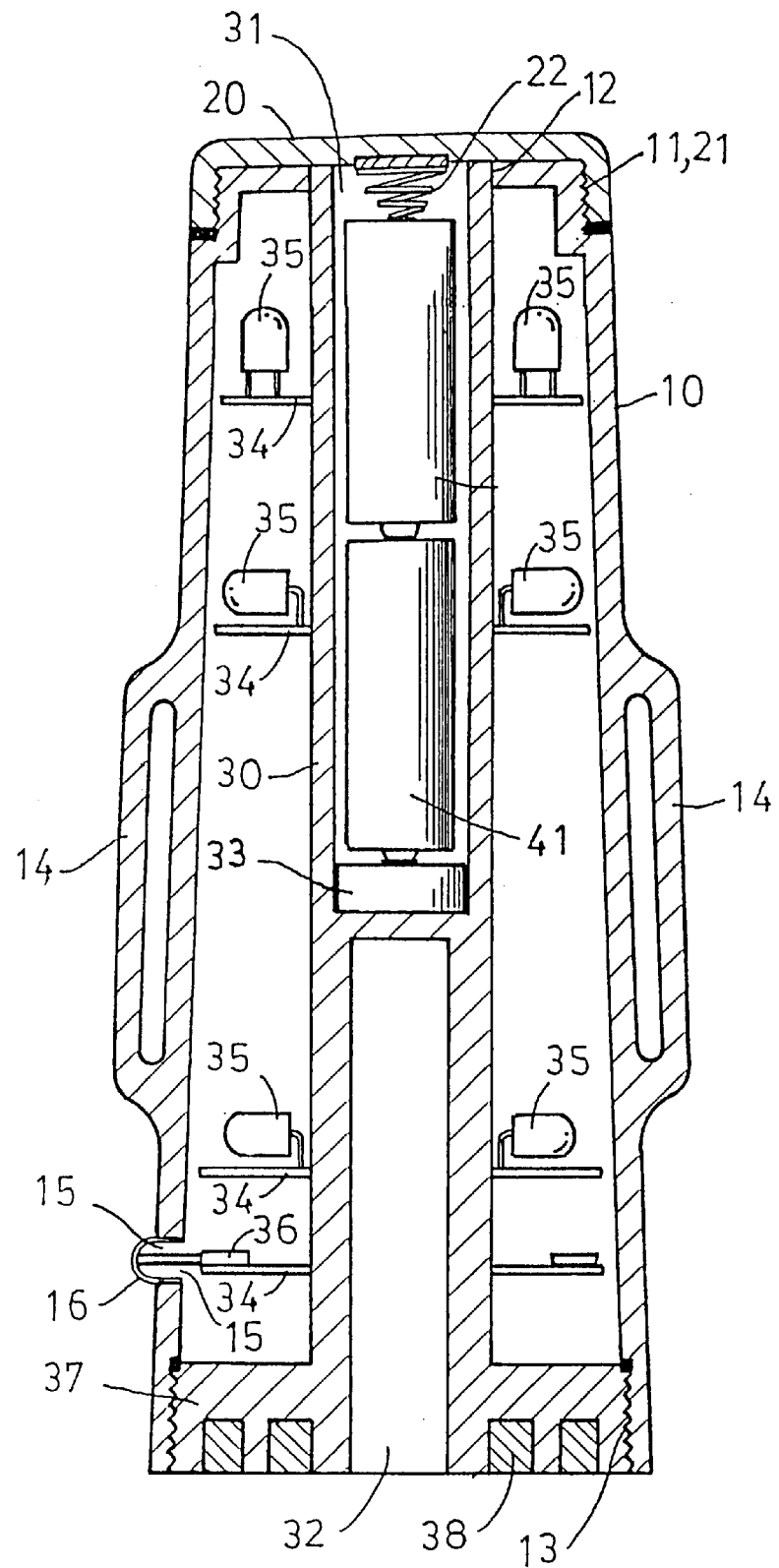
FIG. 2 is a partial cross sectional view showing the assembled inner structure of the illuminating warning device of the invention.

With reference to FIGS. 1 and 2, it is to be noted that the illuminating warning device has a hollow cylindrical casing (10), a cap (20) and an inner tube (30).

The casing (10) is made of a transparent material, such that the light inside the casing (10) is able to penetrate the surface of the casing (10) and provide enough light to the environment. The casing (10) has a threaded upper portion (11), a through hole (12) defined therethrough, a threaded lower portion (13), a handle (14) formed on the outer periphery thereof and a hole (15) defined near the threaded lower portion (13) to receive therein a bonnet (16). The handle (14) is formed for holding or for the extension of a trap (not shown), such that a user is able to hold the device or use the trap to mount around the user's body.

The cap (20) has an inner threaded portion (21) corresponding to the upper threaded portion (11) of the casing (10) and a conducting element (22), such as spring, mounted inside the cap (20).

The inner tube (30) is divided into an upper chamber (31) and a lower chamber (32). The upper chamber (31) is defined to receive therein a battery set (41) and has a connecting plate (33) securely received in the bottom of the upper chamber (31). The inner tube (30) further has a plurality of circuit boards (34) securely mounted on the outer periphery thereof and having a plurality of illuminating elements (35), such as light emitting diode, or light bulb, electrically connected with the circuit boards (34), a switch (36) formed to correspond to the hole (15) of the casing (10), an outer threaded portion (37) formed to correspond to the lower threaded portion (13) of the casing (10) and having a magnet (38) securely received in the lower portion of the inner tube (30). The magnet (38) has an aperture (381) defined therethrough.

In assembly, it is noted that the inner tube (30) is inserted into the casing (10) and secured by the mating between the lower threaded portion (13) and the outer threaded portion (37). Thereafter, the cap (20) is threadingly engaged with the upper threaded portion (11) of the casing (10) to cover the through hole (12). Because the provision of the conducting element (22) and the connecting plate (33), the battery set (41) in the upper chamber (31) is able to form a loop to enable the illuminating elements (35) to light. With different designs of the circuit boards (34), the illuminating elements (35) are able to light continuously or intermittently. However, the design of the circuit board (34) is not the focus of the invention, detailed description thereof is omitted.

After the inner tube (30) is secured in the casing (10), the switch (36) is just received in the hole (15) and covered by the bonnet (16), such that the switch (36) is able to control the ON and OFF of the illuminating elements (35).

Because the loop of the device is completed by the conducting element (22) and the connecting plate (33), the power of the battery set (41) is able to light the illuminating elements (35) and a user is able to control the actuation of the device by pressing the switch (36).

Figure 3:
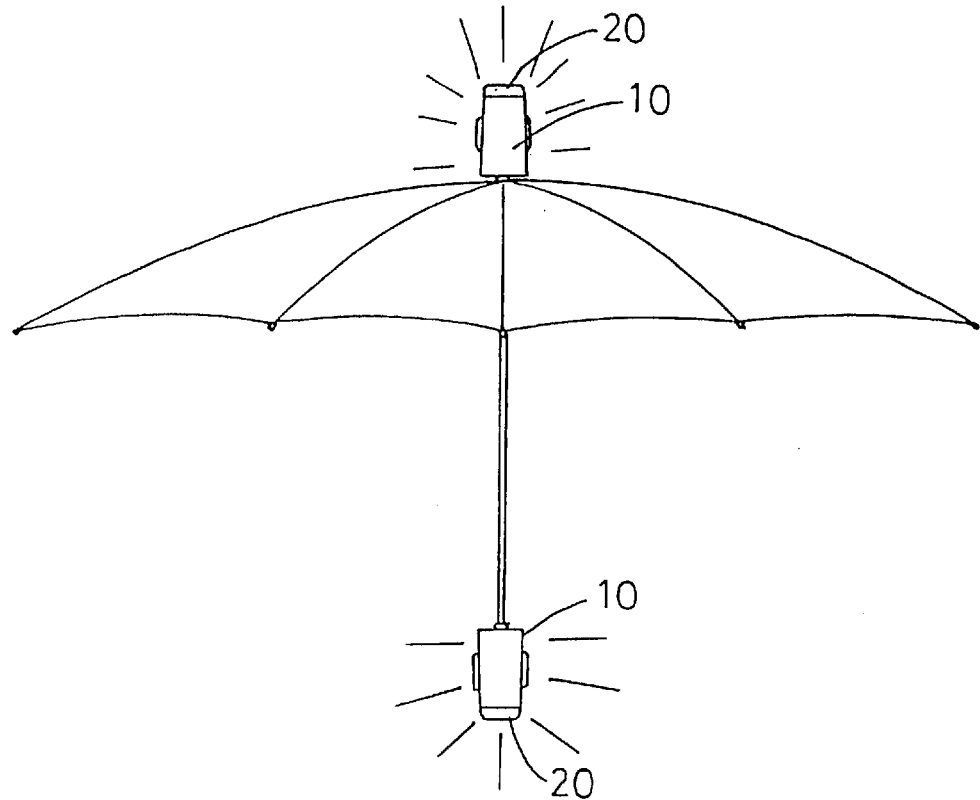
FIG. 3, FIG. 4 and FIG. 5 are side views showing the preferred applications of the illuminating warning device.

With reference to FIG. 3, it is noted that the illuminating warning device of the invention is able to be mounted on the bottom or the top of an umbrella (not numbered) through the aperture (381), such that when a user is holding the device of the present invention and walking in a rainy day, cars from both directions are able to see clearly that a pedestrian is walking ahead.

Figure 4:
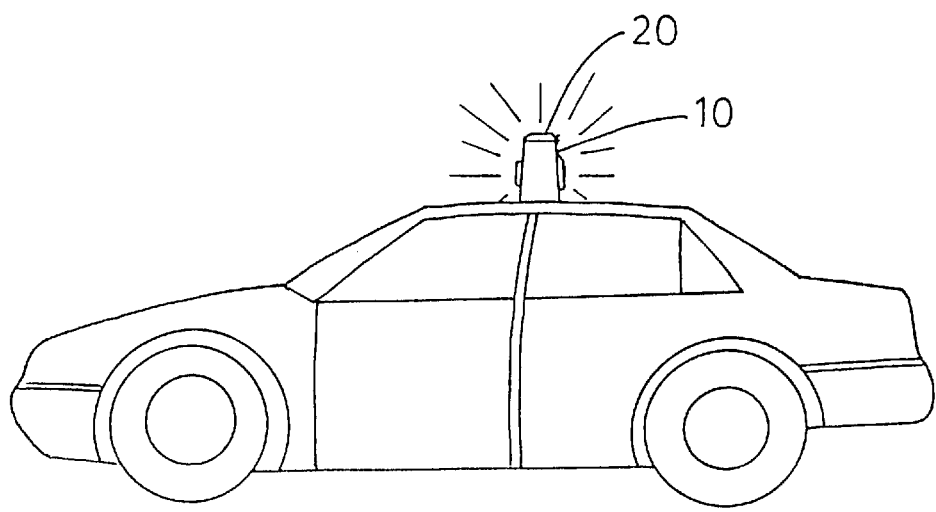

With reference to FIG. 4, due to the provision of the magnet (38), the illuminating warning device of the present invention is able to magnetically adhere to a metal surface of the car, such that when a driver is having an automobile malfunction, the user is able to mount the device on the roof to warn the incoming vehicles.

Figure 5:
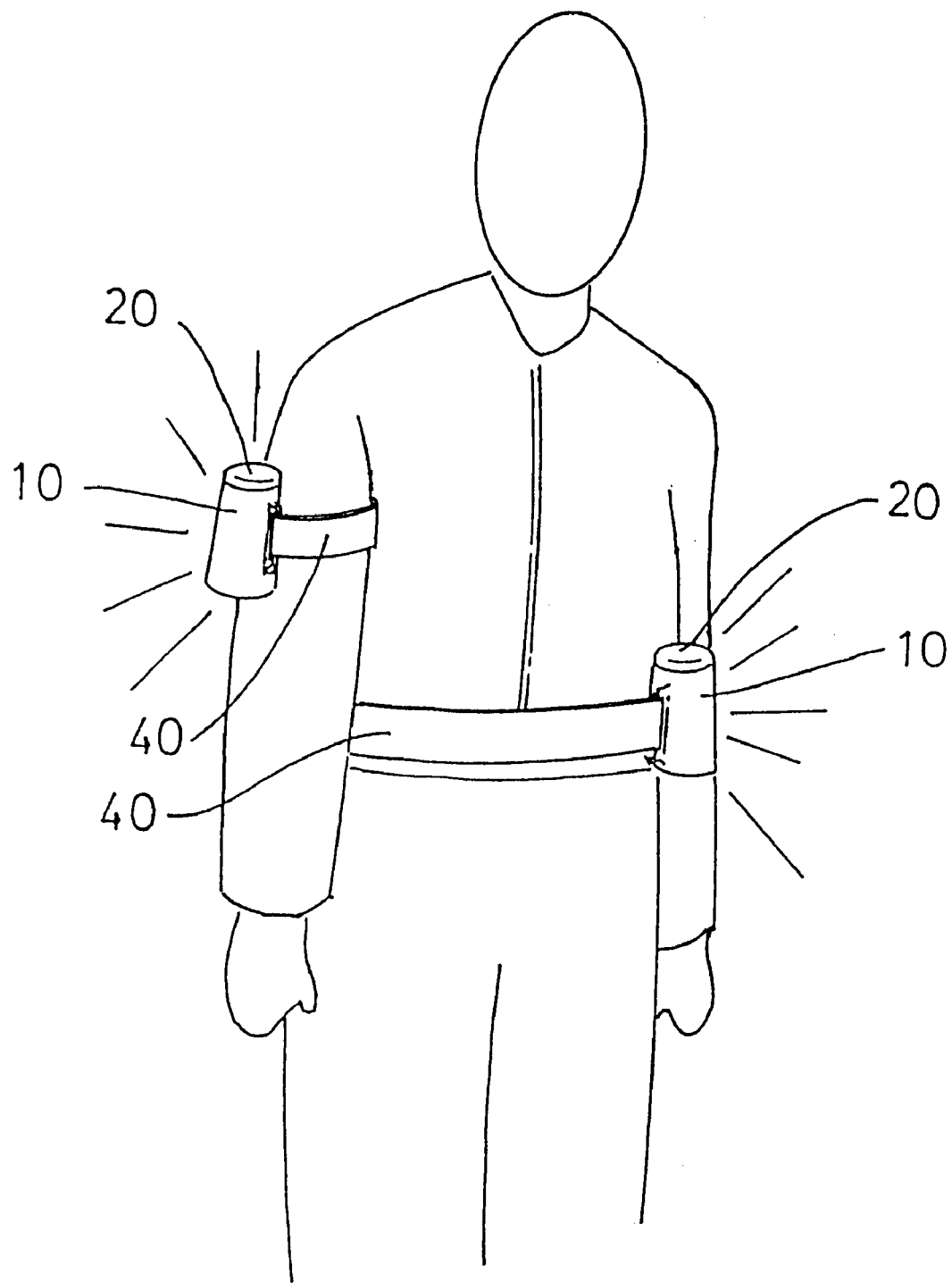

Furthermore, the user is able to mount the device on the arms or any suitable part of the body by a strap extending through the handle (14), such that the user is able to walk with both hands free, as shown in FIG. 5.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An illuminating warning device comprising:

a hollow cylindrical casing (10) having a threaded upper portion (11), a through hole (12) defined therethrough, a threaded lower portion (13), a handle (14) formed on an outer periphery thereof and a hole (15) defined near the threaded lower portion (13) to receive therein a bonnet (16);

a cap (20) having an inner threaded portion (21) formed to correspond to the upper threaded portion (11) of the casing (10) and a conducting element (22) mounted inside the cap (20);

a battery set (41); and an inner tube (30) divided into an upper chamber (31) defined to receive therein the battery set (41) and having a connecting plate (33) securely received in the a bottom of the upper chamber (31), the inner tube (30) further having a plurality of circuit boards (34) securely mounted on an outer periphery thereof and provided with a plurality of illuminating elements (35) electrically connected with the circuit boards (34), a switch (36) formed to correspond to the hole (15) of the casing (10) to control the actuation of the illuminating elements (35), an outer threaded portion (37) formed to correspond to the lower threaded portion (13) of the casing (10) and a magnet (38) securely received in the lower portion of the inner tube (30);

whereby a loop is completed by the conducting element (22) and the connecting plate (33) after the battery set (41) is received in the upper chamber (31) of the inner tube (30).

2. The illuminating warning device as claimed in claim 1, wherein the magnet (38) has an aperture (381) defined therethrough.

3. The illuminating warning device as claimed in claim 1, wherein the illuminating elements are light emitting diodes.

4. The illuminating warning device as claimed in claim 1, wherein the illuminating elements are light bulb.

5. The illuminating warning device as claimed in claim 1, wherein the casing is made of a transparent material.

6. The illuminating warning device as claimed in claim 1, wherein the conducting element is a spring.

* * * * *